United States Patent [19]

LaJovic

[11] 4,028,459
[45] June 7, 1977

[54] METHOD FOR PROTECTIVELY COVERING CONTAINER NECKS

[75] Inventor: Dusan S. LaJovic, Smithfield, Australia

[73] Assignee: Colgate-Palmolive Company, New York, N.Y.

[22] Filed: Apr. 25, 1975

[21] Appl. No.: 571,512

Related U.S. Application Data

[62] Division of Ser. No. 340,293, March 12, 1973, Pat. No. 3,909,182.

[30] Foreign Application Priority Data

Oct. 2, 1969  Australia ............................ 61800/69
Oct. 13, 1969  Australia ............................ 62213/69

[52] U.S. Cl. .................................. 264/159; 264/230; 264/241; 264/274; 264/296; 264/322; 264/342 R
[51] Int. Cl.² .................. B29C 17/00; B29C 27/00; B29F 5/00
[58] Field of Search ...... 264/159, 230, 259, 342 R, 264/159, 259, 230, 342, 271, 241, 274, 296, 322; 156/86, 256; 53/30 S, 184 R, 184 S; 29/417, 447; 425/508, 510, 506

[56] References Cited

UNITED STATES PATENTS

| | | | |
|---|---|---|---|
| 2,223,017 | 11/1940 | Abrams et al. ...................... | 264/230 |
| 2,447,983 | 8/1948 | Little ................................. | 215/246 |
| 3,060,655 | 10/1962 | Dreyfus ............................. | 53/305 |
| 3,187,478 | 6/1965 | Kirkpatrick ....................... | 53/184 S |
| 3,324,625 | 6/1967 | Dulmage ............................ | 53/42 |
| 3,523,052 | 8/1970 | Bolen ................................. | 156/86 |
| 3,640,417 | 2/1972 | Sakurai .............................. | 215/246 |

FOREIGN PATENTS OR APPLICATIONS 678,389  1/1964  Canada ............................ 215/246

Primary Examiner—Willard E. Hoag
Attorney, Agent, or Firm—Strauch, Nolan, Neale, Nies & Kurz

[57] ABSTRACT

Method for applying cover or cladding elements of heat shrinkable plastics material upon the externally screw threaded metal necks of dispensing containers such as toothpaste tubes comprises for mounting a succession of containers and presenting them at an insert applying station having means for advancing the tubular open end of a continuous length of synthetic plastics tubing toward a positioned container neck and for operating upon the leading end of the tubing to separate therefrom successive cover or cladding elements of desired length and dispose each on a container neck prior to a heat shrinking operation for permanently securing the elements upon the threaded necks.

11 Claims, 24 Drawing Figures

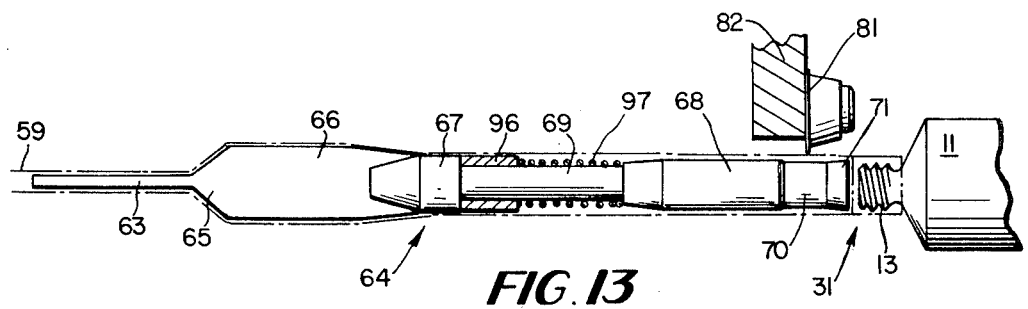
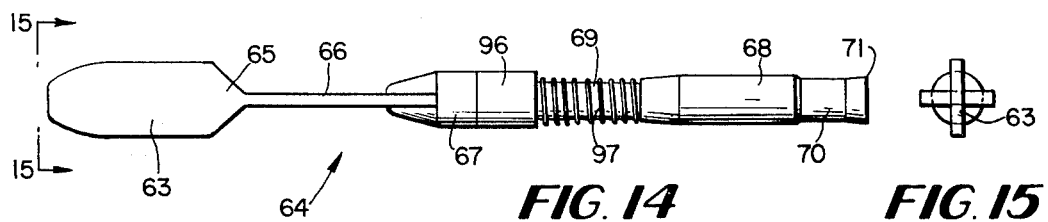
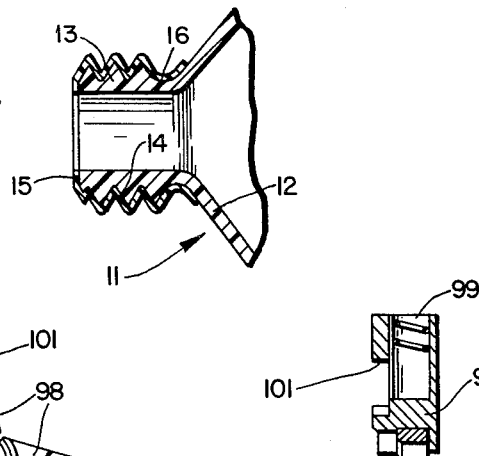
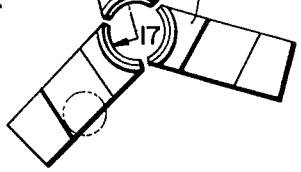
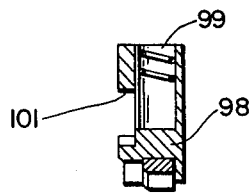
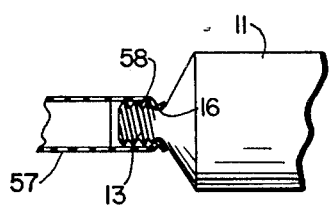
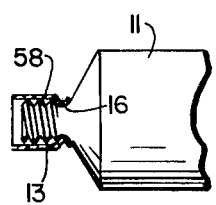
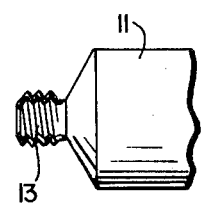

METHOD FOR PROTECTIVELY COVERING CONTAINER NECKS

This is a division of application Ser. No. 340,293 filed Mar. 12, 1973, which issued Sept. 30, 1975 as U.S. Pat. No. 3,909,182.

This invention relates to apparatus and method for applying and securing cover elements of synthetic plastics material externally upon articles and especially on the neck surfaces of dispensing containers, and more particularly in most embodiments to permanently attach such cover elements upon such surfaces that are formed with metal screw threads and like fastener projections adapted to be received in a removable closure cap.

In the manufacture of flexible walled dispensing container tubes such as aluminum or aluminum alloy toothpaste tubes, it is customary to form upon one end a relatively rigid reduced diameter discharge neck having an external screw thread adapted to removably mount an internally threaded closure cap. Where the contents of the tube include abrasive particles, such as in many toothpastes, paste deposited on the external surface of the neck at or near the exit orifice of the neck tends to become discoloured as it spreads onto and abrades the relatively softer exposed aluminum surface of said neck, especially when said cap is removed and reinstalled a number of times during use of the tube contents.

In attempts to overcome the above-mentioned problem in connection with all-metal tubes, it has been proposed to install upon a knurled or other roughened outer surface of the metal neck an enveloping solid plastic sleeve which may be moulded in situ and provided with an inwardly turned lip at the outer extremity thereof so as to cover the erstwhile outer lip of the metal neck. Upon the outer surface of that plastic sleeve a suitable screw thread is formed during or after a moulding operation, and an internally threaded cap (usually larger than standard because of necessary thickness of the sleeve) may then be installed thereon.

A disadvantage of these proposed arrangements is that the exit orifice of the plastic sleeve is usually reduced in area and thereby restricts the normal passage of paste. Furthermore, plastic sleeve attaching and moulding processes are expensive, and the external thread formed on the plastic sleeve is usually insufficiently supported, and the sleeve tends to strip off the neck as the cap is repeatedly removed and replaced. Paull Patent No. 2,829,802 and Fleissig Patent No. 2,184,712 disclose examples of preformed plastic sleeves attached around metal container necks, and the formation and attachment of such sleeves by a molding operating is disclosed for example in the patents to Schutz No. 3,073,485; Remington No. 3,124,273 and Goff et al No. 3,144,964.

Another proposed solution of the problem in wide use today has been to secure solid plastics neck units or combination shoulder and neck units, usually recently by a molding operation, to metal or laminated metal-plastic tube bodies. Besides the expense of the molding or other attachment operation, the combination metal-plastics tubes are more expensive overall than all metal tubes. Examples of such proposals are disclosed in the Patents to Roselle No. 2,038,760; Hoch No. 2,352,384; McGeorge No. 2,794,574; Brandt No's 3,295,725 and 3,260,410 and Saeki No. 3,465,917.

The invention in its broadest aspect provides for the protective covering of articles in general, and in particular to the external threaded or like exposed surfaces of dispensing container necks with a synthetic plastics material in a manner that is efficient and rapid and adds minimum cost to that of providing the container itself, and this is an important advantage of the invention.

In a preferred embodiment the invention will be described in detail as incorporated in a novel method and method wherein thin-walled light weight tubular cover elements or collars of required size are severed in succession from the leading end of a continuous length of tubing of heat shrinkable synthetic plastics and each of these element is positioned and heat shrunk in permanent surrounding relation upon the external metal surface of a dispensing container neck. It will be understood that in its broadest sense the invention contemplates continuous methods for applying shrinkable plastic coverings upon articles. It has been proposed to heat shrink an individual tubular plastics element upon the threaded neck of a glass container as disclosed in Ford Patent No. 2,376,909 and removably on the threaded neck of a metal container as disclosed in Canadian Patent No. 678,389 but no art is presently known to applicant proposing or suggesting the novel subject matter hereinafter claimed.

It is an important advantage of the invention to provide a novel method wherein metal containers having discharge necks provided with external threads or like fastening formations are fed in succession into and through a cover element applying station where the necks automatically receive tubular cover elements of heat shrinkable synthetic plastics material.

Another advantage of the invention is the provision of methods for synchronously feeding hollow synthetic plastic tubing into a cover element applying station and surrounding the necks of containers positioned in succession at that station with tubular elements severed from the leading end of the tubing.

The invention provides an another advanatage a as novel method employing special floating mandrel for spreading synthetic plastics tubing from flat to tubular condition and feeding and guiding the tubing toward the neck of a container positioned in a cover element applying station.

A further advantage provided by the invention is a novel method synchorinized plastics tubing feeding and cutting mechanism arrangement associated with a floating mandrel that is peripherally enclosed by the moving tubing.

Another advantage of the invention is a novel method incorporating the provision of a container or other article carrier member such as a rotary drum wherein containers are retained by suction in surface grooves, and the member is intermittently advanced to locate containers in succession at a container neck or article cover element applying station. Pursuant to this arrangement the containers of articles enter and leave on a continuously moving conveyor having an intermediate portion that moves intermittently with the carrier member.

Further advantages, particularly with respect to novel methods for carrying out the foregoing will appear in connection with the following description and claims and the annexed drawings.

BRIEF DESCRIPTION OF DRAWINGS

FIG. 13 is an enlarged side view partly in section of a portion of FIG. 7 further illustrating the tubing feeding mandrel;

FIG. 14 is a plan view of the mechanism of FIG. 13;

FIG. 15 is an end elevation taken substantially on line 15—15 in FIG. 14;

FIG. 16 illustrates a set of gripping jaws in the feed mechanism of FIGS. 8 and 9;

FIG. 17 is a sectional detail taken substantially on line 17—17 in FIG. 16;

FIGS. 18 to 21 diagrammatically illustrate successive stages in the application of a tubular cover or cladding elememt to the threaded neckpiece of a collapsible tube body;

PREFERRED EMBODIMENTS

Figure 1:
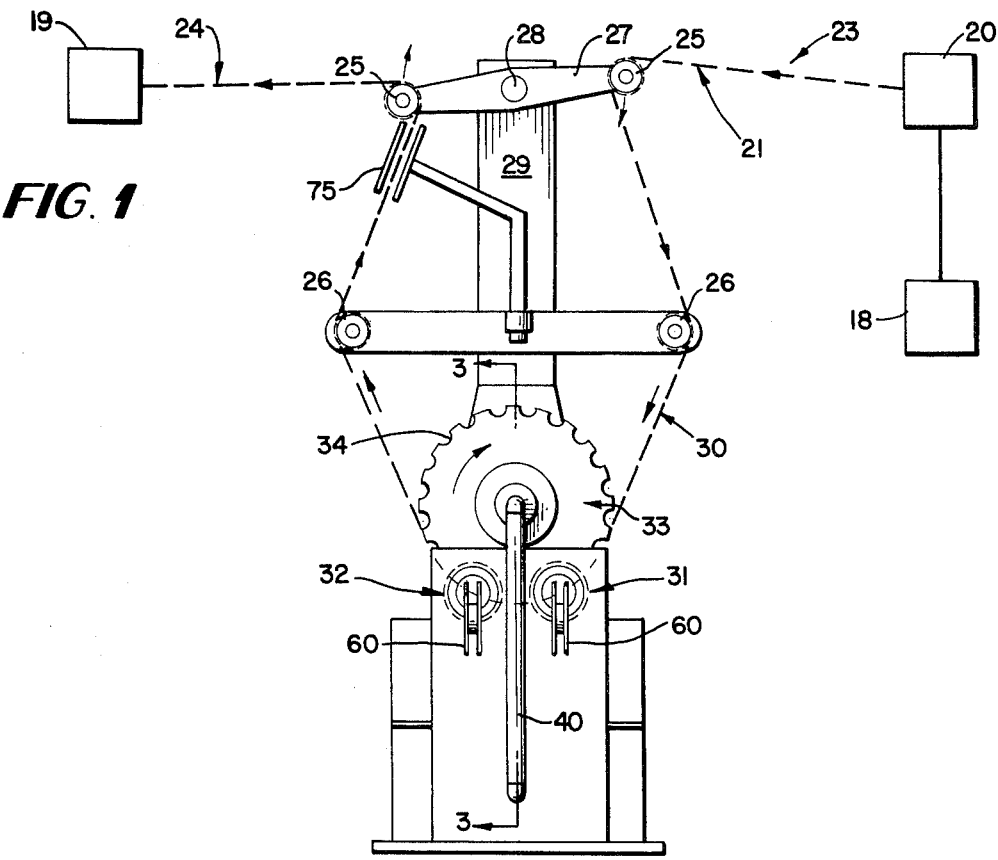
FIG. 1 is an end elevation of a mechine for cutting and applying protective tubular cover or cladding elements to the threaded necks of toothpaste or like collapsible containers.

Referring first to FIG. 21 in the drawings, an empty tubular toothpaste container 11 has a collapsible body and a tapered end shoulder 12 terminating in a reduced diameter relatively rigid hollow dispensing neck 13. Container 11 is preferably an integral metal element, usually aluminum or an aluminum alloy. The neck is externally screw threaded at 14 and the open end of the neck is surrounded by an axially outwardly facing lip 15. Since these threads are usually formed in a molding or cutting operation, the invention requires no departure from known methods of making such metal containers. While neck 13 is shown as formed with a plurality of threads 14, the invention of the preferred embodiment herein described is applicable to a container neck having only one or any number of continuous or interrupted threads or other projections or formations for mounting the closure cap. At the juncture between the neck and shoulder is formed an annular undercut region 16 that is of reduced diameter with respect to the roots of the neck threads.

Figure 2:
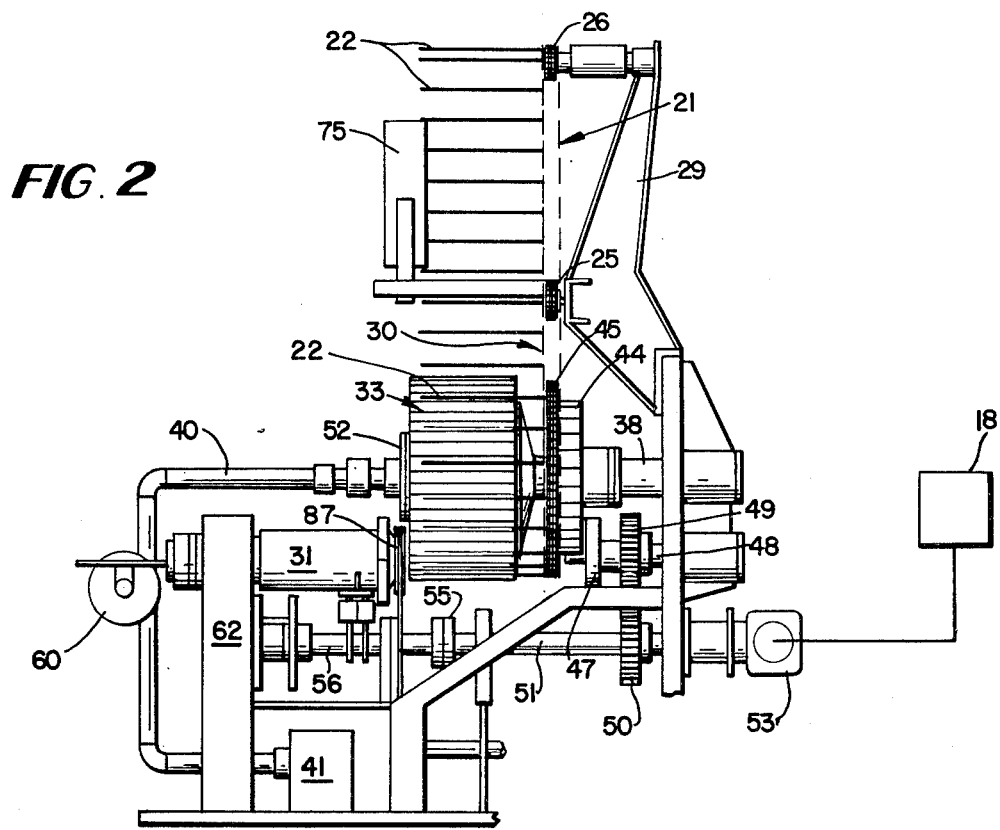
FIG. 2 is a side elevation of the machine shown in FIG. 1 showing mainly container infeed arrangements.

The apparatus now to be described intrudes a container neck covering or cladding operation into a continuous production run, which (apart from this intrusion) may be of conventional kind. In FIGS. 1 and 2, the neck covering or cladding station is show as an intrusive insertion to modify containers being moved on a chain conveyor which brings open-ended but otherwise fully-formed dispensing container bodies from a forming apparatus therefore, feeds the container bodies through the thread covering station and subsequently conveys the bodies to appropriate capping, filling or other treatment stations. The container bodies delivered to this staion are unfilled and uncapped (see FIG. 18).

Figure 6:
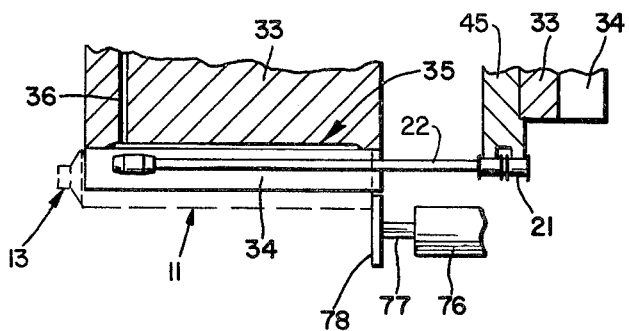
FIG. 6 is an enlarged fragmentary sectional detail of part of FIG. 3 showing positioning of a collapsible tube body when a cover or cladding element is about to be applied to its threaded neck.

The container body conveyor is preferably of roller chain type and consists of a more or less conventional type endless chain 21, carrying laterally projecting cantilever fingers 22, upon each of each of which fingers a collapsible container body 11 may be loosely carried as indicated, for example, in FIG. 6. fingers 22 are rods projecting at right angles to the path of movement of the conveyor chain. Container bodies, of which the necks 13 are to be covered, arrive by inlet chain portion 23 (FIG. 1) and leave the neck covering station by chain portion 24.

As illustrated in FIG. 1 the empty container bodies are extracted on moving chain portion 23 from the drying oven of a printing and coating station 20 wherein the tubes are heated up to 270° F for quick drying of the applied ink or other surface coating. Thus a considerable amount of heat energy is stored in the metal of each container body, and preferably the cover applying station is located as closely as possible to the outlet of the drying oven to utilize at least a portion of this retained heat as will appear.

Also, for a reason to appear, the moving chain portion 24 taking the modified container bodies away from the cover applying station delivers them as soon as practical to a capping machine 19 where the usual internally screw threaded caps are mounted on the covered necks while the plastic may still be warm and capable of being more closely conformed to both the external threads of the container neck and the internal threads of the cap, as disclosed in said application Ser. No. 329,999.

Chain 21 is continuously driven by suitable means (not shown) both in approaching and leaving the cladding station and passes ove take-up idler sprockets 25 mounted on a loop control beam 27 fulcrumed at 28 on fixed machine frame portion 29, and guide sprockets 26 mounted on fixed axes in the frame. The purpose of pivoting beam 27 is to enable the chain portions 23 and 24 to run continuously while the intermediate chain portion 30 is intermittently halted during neck cladding operations as will be described.

In the illustrated machine, two similar container neck covering stations are provided; these being respectively indicated at 31 and 32. Tubular container bodies to be modified are fed through these stations by intermittent rotation of a surface grooved carrier member such as drum 33. Each groove 34 of the drum extends longitudinally of the drum surface parallel to the axis of rotation of the drum and is contoured and able to accommodate a single container body. The angularity with which the chain approaches and leaves drum 33 is determined by the location of sprockets 26, and they are preferably so located that chain portion 30 between sprockets 26 and the drum is tangent to the drum for optimum entry of the containers into the drum grooves. So that the container bodies will be accurately and closely nested and securely maintained within their respective carrier drum grooves, each groove 34 is preferably provided with vacuum suction devices best shown in FIGS. 3 and 6, where it will be seen that each drum groove 34 has a floor groove 35 (see FIGS. 3 and 6) connected by a radial duct 36 to a distributor port 37 in a stationary drum support shaft 38.

Preferably drum 33 is an integral part made of polytetrafluofluoroethylers or the like having low heat conductivity to preserve retained heat in the container bodies and no sharp edges to mar the container body surfaces.

Ports 37 open into shaft passage 39, which in turn opens to conduit 40 leading to suction pump 41. Ports 37 in shaft 38 are sealed relative to shaft 38 and rotary drum 33 as by a pair of resilient O-ring seals 42.

Drum 33 is mounted for rotation around stationary shaft 38, as by bearing sleeve 43 to which the drum is fixed.

Also fixed on sleeve 43 is a Geneva type star-wheel member 44 that in turn is fixed to a main sprocket wheel 45 with which the intermediate portion 30 of container conveyor chain 21 is meshed.

Drum 33 receives its intermittent drive through operation of a Geneva type movement by way of a cam roller 46 mounted eccentrically on a continuously rotated crankpiece 47 fixed on countershaft 48 carrying driven gear 49 meshed with a driving gear 50 fixed on a drive shaft 51.

A spring-loaded brake-disc 52, splined for longitudinal movement on stationary shaft 38 and biased by spring 52' to frictionally engage drum 33, arrests and prevents over-free rotation of drum 33 after it has been rotated through a predetermined arc by actuator 46, 47.

When chain portion 30 is halted during the dwell periods of drum 33, beam 27 swings counterclockwise moving at one end to increase the size of the chain loop at chain portion 23 while the other end swings to decrease the size of the chain loop at chain portion 24. Then when the drum 33 is intermittently rotated it moves chain portion 30 at sufficiently higher speed then the continuously driven speed of portions 23 and 24 that the beam 27 and the chain loops restore to the condition shown in FIG. 1 before the next dwell period.

Drive shaft 51 is continuously driven through a gear box indicated at 53, by which the drive for the cladding apparatus is coordinated and synchronized with the drives of the apparatus which brings container bodies to the neck covering stations by way of chain portion 23, and sends the modified containers away for filling or other treatment by way of chain portion 24. For example the chain portion 23 and gear box 53 may be drive connected as diagrammatically indicated in FIGS. 1 and 2 to a common drive source 18.

It will be understood that as two neck covering stations are provided, two container bodies may have their necks covered simultaneously, each arcuate displacement of the drum disposing a pair of containers in position to be clad. Thus the number of drum halts per revolution may be half the number of grooves 34 in drum 33. By way of example, the star wheel member 44 may have ten equally spaced valleys 54, each able to receive cam roller 46; in that case, twenty parallel grooves 34 spaced 18° circumferentially are provided on drum 33.

Shaft 51 is drive-connected by coupling 55 to a camshaft 56, the function of which will be described later.

Referring to FIGS. 18 to 21 the task of the container neck covering apparatus is to draw plastics tubing 57 from a supply thereof, cut off a short tubular leading end section of the tubing of predetermined length to provide a short collar or cover element 58, and apply that element to the neck of a container body positioned to receive it, in readiness for heat shrinkage or other treatment designed to cause it to closely envelope the neck as shown in FIGS. 20 and 21.

The tubing 57 may be any suitable heat shrinkable plastic. The preferable material is a polyvinylchloride film that is only a few mils in wall thickness and capable of providing cover elements of the requisite size slipping quickly over the threaded tube neck. Other examples of heat shrinkable film materials are polyester, polyethylene, polypropylene, polyvinylidene and pliofilm. Other heat shrinkable materials are disclosed in U.S. Pat. No. 2,452,607.

Tubing material, starting as a flatly collapsed tape 59, proceeds from a pair of supply reels 60 towards each of the neck covering stations 31 and 32 indicated in FIG. 1. These stations are similar, and hence only one will be specifically described, here station 31.

After leaving reel 60, tape 59 proceeds within a feed guide pipe 61 stationarily mounted in machine frame portion 62. The tape leading end (see FIG. 7) opens and sheathes around and slides along a distal web 63 forming part of a feed mandrel 64 which extends to neck covering station 31. This mandrel is not absolutely restrained against movement and may be regarded as a floating element which is free to move in any direction but only to an extremely limited extent; an extent of no greater magnitude than is compatible with the tubular material (which encases the mandrel throughout its length) having to be capable of free movement towards the cladding station without similar advancement (to any substantial degree) on the part of the mandrel.

Mandrel 64 is illustrated best in FIGS. 7 and 13-15. The distal web 63 projects inside the tape 59 and merges by way of shoulder piece 65 into a tubing spreading web 66 disposed at right angles to the distal web 63. The angle of shoulder 65 is preferably 45°. The effect of the tape passing over webs 63 and 66 is to reshape it from flat condition to expanded tubular condition. Web 66 is fixed relative to a first cylindrical barrel portion 67 of the mandrel which adjoins a second cylindrical barrel portion 68 by way of a reduced diameter shank 69. The mandrel extends from barrel portion 68 to a cylindrical severing portion 70 of slightly reduced diameter and this severing portion merges into a diverging tapered end-piece 71 which at the extreme end of the mandrel has its diameter substantially equal to that of the barrel portions 67 and 68; that is, a diameter which is smaller than that of the tubing by no more than is necessary for that material to be able to slide along the mandrel.

Mandrel 64 is advantageously of special composite construction. Preferably the webs 63 and 66 which may be formed as an integral unit are composed of a hard smooth plastics material such as polytetrafluoroethylene. This has been found markedly superior to metal for providing smooth efficient opening of the moving flat plastic tubing. The mandrel section comprising barrel portion 67, shank 69 and barrel portion 68 may advantageously be of metal for rigidity. The end piece 71 which abuts the container neck is preferably composed of a heat insulating material such as polytetrafluoroethylene inserted for example as a plug fixed on the hollow end of barrel portion 68, and its purpose as will appear is to minimize heat loss from the container tube during the operation of applying element 58.

Figure 7:
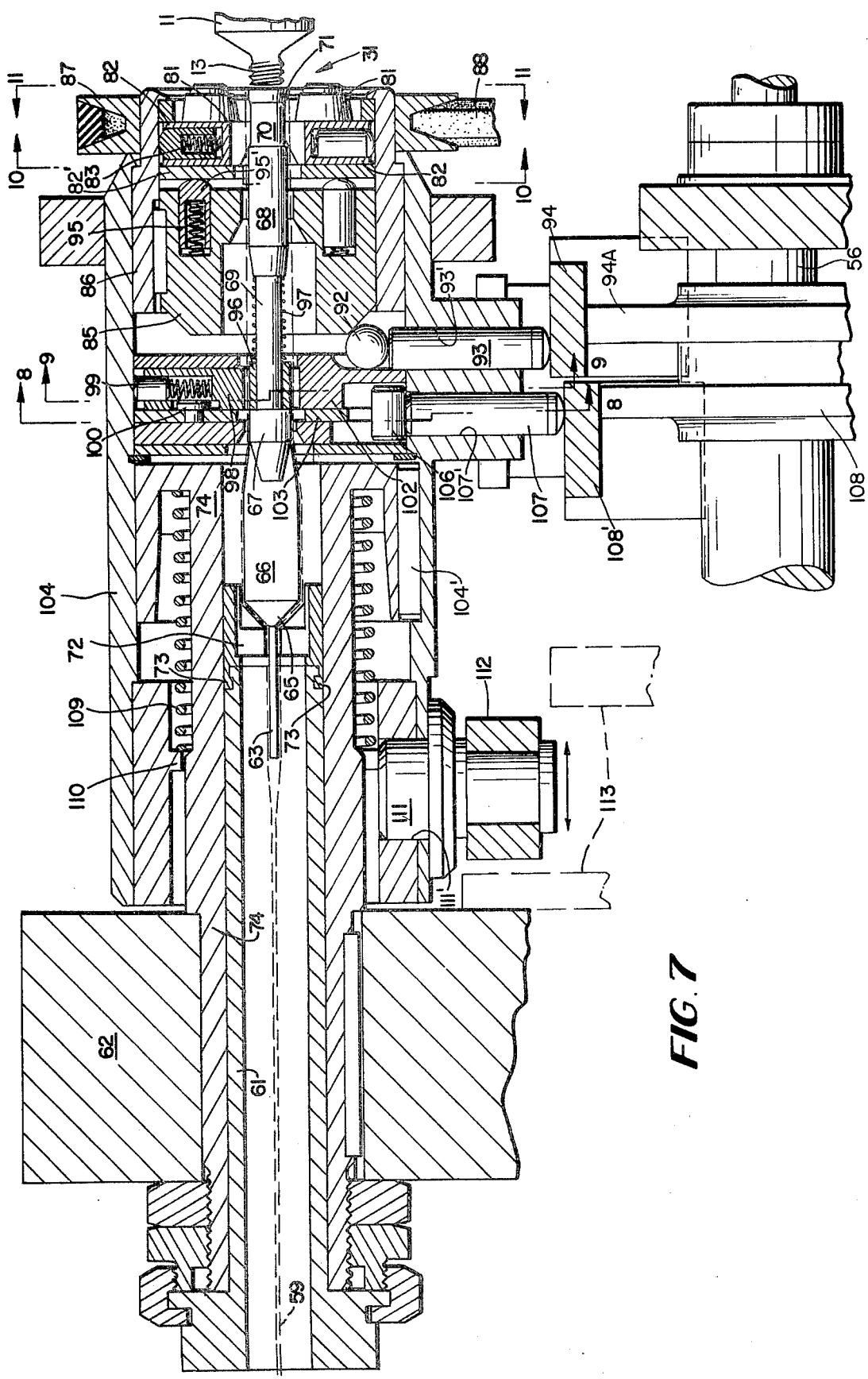
FIG. 7 is an enlarged sectional side elevation taken substantially on line 7—7 in FIG. 4 and showing details of the plastic tubing shaping, feeding and severing arrangements.

As illustrated in FIGS. 7 and 13, the mandrel throughout its length is peripherally encased by the expanded plastics tubing and that because of this, the mandrel is unsupported except insofar as such support is exerted through the tubing.

As previously indicated also, the mandrel has a small degree of universal floatability; that is, it is not absolutely restrained against movement in any direction, although its freedom for such movement is very limited. It does have enough freedom of longitudinal movement to insure that it presses against the container neck as the tubing is being fed to dispose element 58 in the neck. Thus, the mandrel is supported loosely by the integers which surround its barrel portion 68 and also by its shoulder portion 65 which sits within a supporting collar 72. This supporting collar is formed in two semi-cylindrical portions which are concentrically attached to the feed pipe 61 by flanges 73 entering suitable grooves. Obviously, the supporting collar 72 can be attached to or removed from the feed pipe 61 only when that pipe has been withdrawn from the mounting tube 74.

Figure 3:
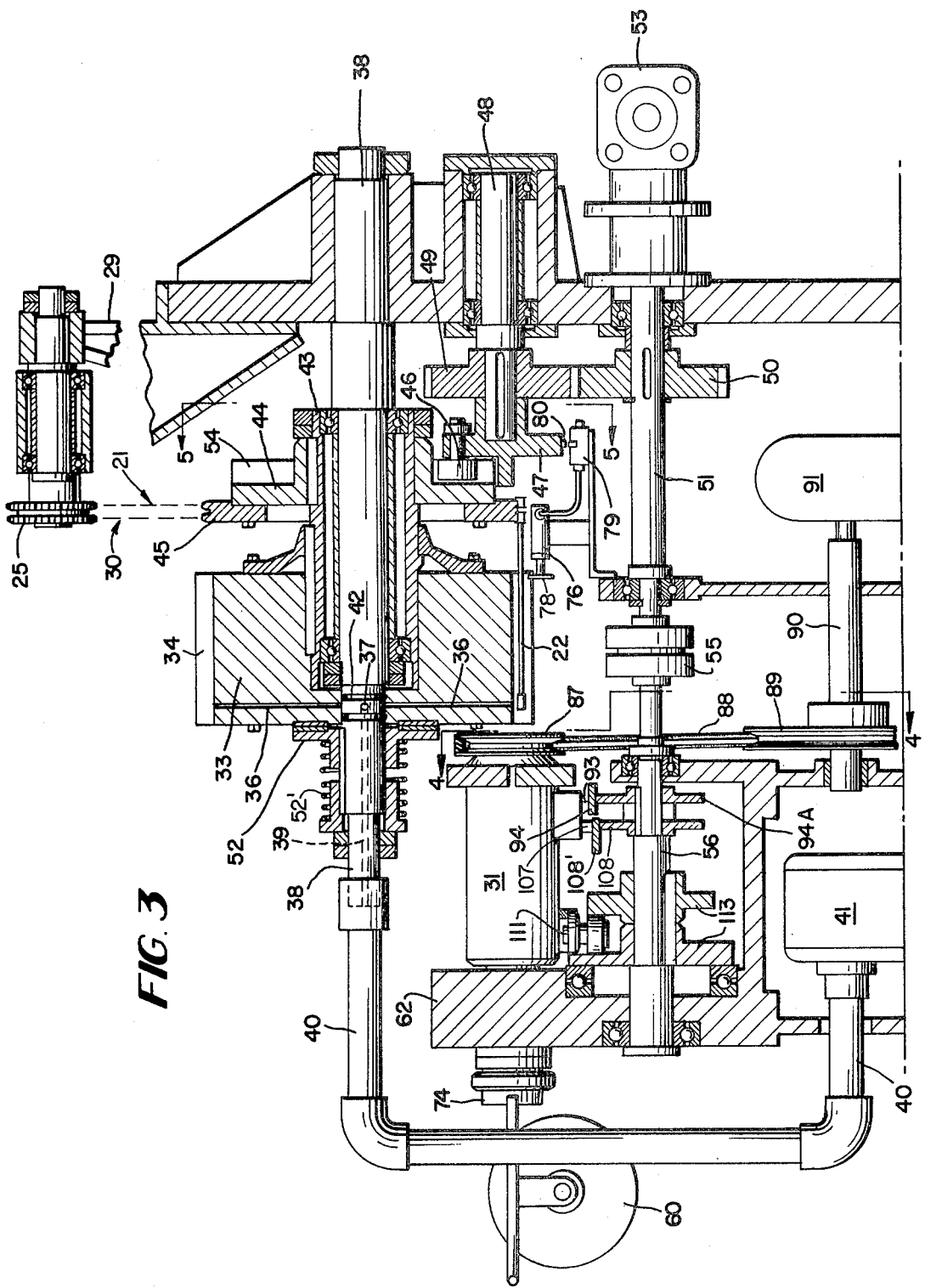
FIG. 3 is an enlarged side elevation in section taken substantially on line 3—3 in FIG. 1 showing mainly container positioning mechanism.

Mounting tube 74 is mounted rigidly on the machine frame and preferably each reel 60 is freely rotatably mounted on bracket arms 60a fixed on a bar 60b rigidly mounted on the outer end of tube 74 as shown in FIG. 3. This properly locates the tubing supply in the machine.

The split supporting collar 72 restrains excessive endwise movement of the mandrel away from station 31, and in that station endwise movement of the mandrel is restrained by the occasional presence of a container neck 13. On such occasions when a container may not be presented at the station, the mandrel is prevented from excessive endwise movement (to the right in FIG. 7) by the frictional contact around it of the tubing and this is sufficient simply because under those circumstances (no container neck presented to the station) the mandrel is not subjected to any force tending to advance it relative to the station.

As shown in FIGS. 7 and 13, the incoming tubing is spread by the web 66 at right angles to the plate of flatness from which it has been initially spread by the web 63. By the time the leading end of the tubing reaches and starts sliding over mandrel barrel portion 67 it is expanded to substantially cylindrical open end condition.

The tubing continues to encase the mandrel right to the neck covering station and when the tubular open leading end reaches that station a suitable short length or cover element 58 is severed from it. The severed cover element together with the remainder of the tubing surrounding the mandrel is then advanced for the neck covering operation. The mandrel itself during the tubing feeding operation advances slightly in the direction towards the neck positioned to receive the cut-off element 58, but it is soon halted by abutment with the container neck endwise presented to the mandrel in the cladding station. The heat insulated end 71 of the mandrel guards against heat transfer from the container. When the mandrel has been so halted and remains in abutment with the container neck, the severed element 58 will continue to advance relative to the mandrel under the action of the tubing feeding means later more specifically described so that it is applied in surrounding relation to the container neck, this condition being indicated in FIG. 18.

Once the cover element has been applied around a container neck and the neck carrying that element has been moved clear of the cladding station, as indicated in FIG. 19, the motion of chain portion 30 carries the neck between a pair of heating elements 75 (see FIGS. 1 and 2) which cause complete shrinkage of the element 58 so that it will closely conform with the container neck as shown in FIGS. 20 and 21.

As shown in FIG. 18 the longitudinally displaced cover element 58 moves quickly over the threads 13 until it abuts the metal of shoulder 12 which because of its greater mass is usually hotter than threads 13. In any event the conditions are such that element 58 does not start to heat shrink upon the neck at least until its leading end is around the undercut region 16 where as illustrated in FIG. 18 that leading end annularly contracts into the region 16. The retained heat at threads 13 may be enough to at least partly shrink the arrested element 58 upon them. In any event the initial contraction into region 16 anchors the very light element 58 on the container neck and keeps it there while the container is moved out of the station 31 and into the heat applying station at 75.

In covering a container neck according to this embodiment, it is necessary to cut a suitable element from the plastics tubing and transfer the severed element to a container neck properly presented to the covering station. So far as positioning the container neck is concerned, the intermittent drive for carrier drum 33 and the suction holding means associated with that drum, will ensure correct transverse positioning of a container body carried by the drum to ensure the neck of that container body becoming co-axially aligned at the cladding station and, similarly aligned (or almost so) with the departure end 71 of the floating mandrel. Before having element 58 applied to it, the presented container neck should be correctly placed relative to the cladding station, not only laterally as explained above, but also longitudinally. To this end, a compressed air cylinder 76 is provided as shown in FIGS. 3 and 6. This air cylinder has a piston which carries a pusher 78. The cylinder is actuated by a control valve 79 which is connected to a suitable pressure source and operated by a striker 80 on the rotating crankpiece 47. A separate cylinder 67 and control is provided at each station 31 and 32. The piston in each cylinder 67 is periodically actuated to longitudinally position a container body each time crankpiece 47 makes a complete revolution and striker 80 opens the valve 79. The valve 79 recloses after striker 80 passes it and pusher 78 is retracted by an internal spring bias (not shown) on the piston.

The pusher 78 is normally retracted so to permit oncoming container bodies on the rotatable drum 33 to arrive in axial alignment with the respective cladding stations. Upon such arrival, piston rod 77 is actuated in timed relation so that the pusher 78 pushes the container body slidably along its groove 34 towards and to a predetermined location in the cladding station, almost in contact with the adjacent end face of the mandrel even if the latter is fully retracted. The suction holding action at each groove 34 provides for controlled longitudinal displacement of the relatively lightweight container, so that it is not pushed further than the stroke of cylinder 76. The operation of pusher 78 combined with the available short longitudinal movement of the floating mandrel insures that the mandrel will be in end abutment with the container neck during transfer of element 58 onto the container neck.

Should the mandrel happen to be projected longitudinally beyond the cladding station, the container neck being presented to that station will abut and cause it to be moved inwardly substantially as shown in FIG. 7.

Once a container neck has been presented to the cladding station, the covering element 58 may be severed from the cladding material tubing and this may be effected by disc knives 81 which were preferably four in number as shown in FIGS. 4, 7 and 10-12, a pair of knives being mounted in each of a pair of radially movable brackets 82 which are constantly influenced to move towards the mandrel axis by compression loading springs 83.

The brackets 82 are mounted for movement toward and away from each other in appropriate sliding runways in guide structure 82' and are normally held apart by a pair of axially extending wedge-heads 84 interposed between them and secured on a slidable member 85. Member 85 is longitudinally slidably and non-rotatably mounted within a drive sleeve 86 on which is fixed a pulley 87. The whole assembly of parts within drive sleeve 86 is rotatable as a unit by pulley 87 receiving drive through belt 88 from drive pulley 89 on shaft 90 driven by motor 91.

when the knives 81 are to sever a length of tubing, the wedge-heads 84 are retracted from between the brackets 82 so that the springs 83 may then operate to automatically bring the rotating knives 81 into severing relationship with that portion of the tubing which encircles the mandrel severing portion 70.

Figure 4:
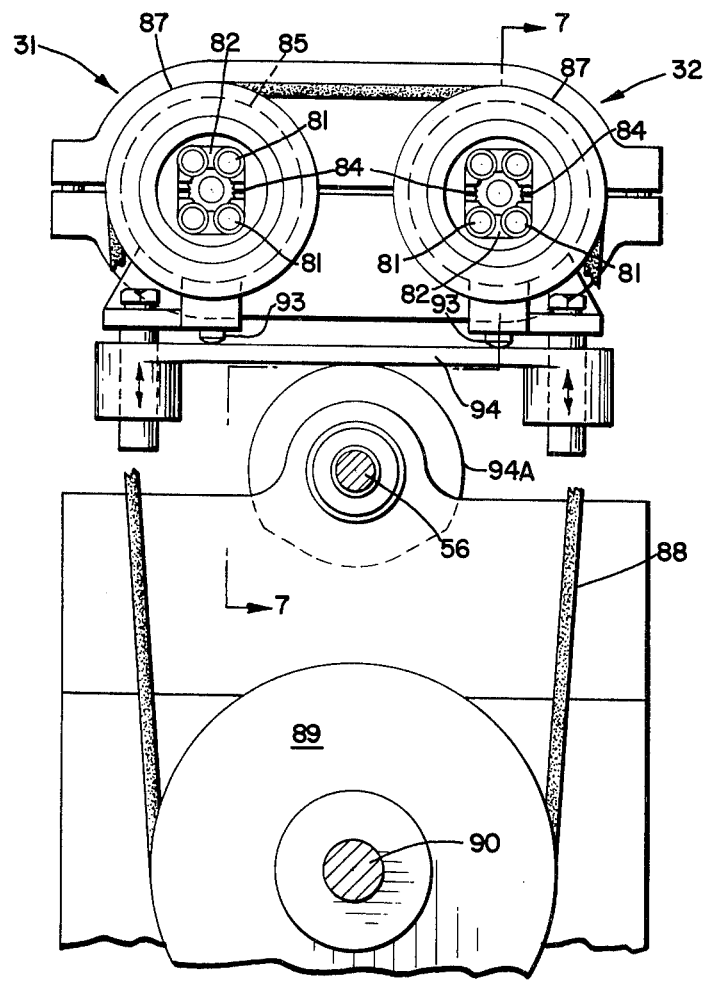
FIG. 4 is partly sectioned end elevation taken substantially on line 4—4 in FIG. 3 showing mainly the drive to the tubing severing mechanism.
Figure 5:
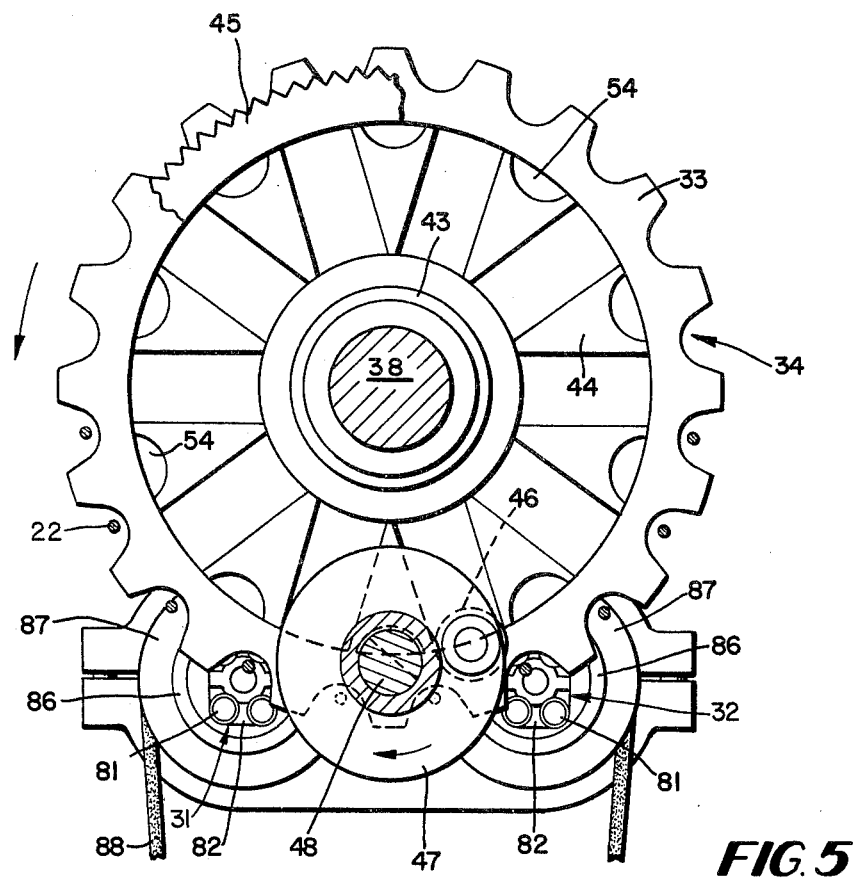
FIG. 5 is a partly sectioned end elevation taken substantially on line 5—5 in FIG. 3 showing the intermittent drive to the container positioning mechanism.

This retraction of wedge-heads 84 is effected by lowering of the follower ball 92 (FIG. 7) which engages a smooth conical cam surface 85' on member 85 and rides a slidable follower pin 93, which in turn, rests upon bridge bar 94 slidably riding a severing cam 94A. As shown in FIG. 4 a single cam 94A and bridge bar 94 may actuate pins 93 of both stations 31 and 32 at the same time. Pin 93 is mounted in a vertical slide guide bore 93' and follows bar 94 due to gravity. Member 85 is biased by compression springs 95 acting through thimbles 95' bearing against the relatively fixed guide structure 82' to retract the wedge-heads, but retraction is prevented when ball 92 is disposed in the upper position shown in FIG. 7. Cam 94A is fixed on cam shaft 56 so as to be operable synchronously with the intermittent movements of carrier drum 34.

It will be understood that cam 94A normally keeps ball 92 thrust upwardly in rolling contact with member 85 so that member 85 is disclosed to the right in FIG. 7 and the wedge-heads 84 hold the cutting blades 81 clear of the tubing surrounding portion 70 of the mandrel. Periodically cam 94A operates to allow pin 93 to drop down thereby effecting withdrawal of ball 92 from holding member 85 so as to permit that member to be displaced to the left in FIG. 7 to withdraw the wedge-heads and thus allow severing action to go forward. Following the severing operation cam 94A acts to displace bar 94, pin 93 and ball 92 back up to the FIG. 7 position to again separate the knives from the cladding tubing.

Having severed a cladding element 58, it is then necessary to transfer it to the waiting container neck. This transfer takes place after pusher 78 locates the container axially in groove 34. To effect the transfer, the oncoming tubing is advanced towards the cladding station (to the right in FIG. 7) by an amount equal to the length of the severed element. The tubing is advanced relative to the mandrel by reason of the mandrel being incapable of similar movement by reason of its limited axial float and usually being obstructed by the presented container body neck. However, if necessary the mandrel will have advanced toward the waiting container neck sufficiently that there is substantial abutment, and transfer of the severed element 58 from the mandrel to neck 13 is effected without risk of that element dropping off or becoming misaligned. Before advancing the tubing, the knives 81 will have been retracted due to the action of cam 94A as explained and the oncoming tubing then suffices to act as a pusher to transfer the severed cover element onto the waiting container body neck.

To enable intermittent feeding of the tubing, the reduced diameter shank portion 69 of the mandrel has a freely slidable sleeve 96 mounted thereon. Sleeve 96 is lightly axially spring-loaded by compression spring 97. Sleeve 96, like the mandrel, is encircled by the tubing and when the tubing is to be advanced, a plurality of chuck jaws 98 are displaced to grip the sleeve 96, through the surrounding tubing, which is clamped therebetween, and then move the sleeve and the tubing together the required distance towards the cladding station (to the right in FIG. 7). Preferably the external periphery of the sleeve 96 is roughened or covered with an antifrictional material to increase the grip of the clutch. Chuck jaws 98 are tightened upon the tubing by loading compression springs 99 and are normally held off from the gripping position by rollers 100 disposed in oblique transverse slots 101 in the chuck jaws 98.

Jaws 98 are radially slidably mounted in runway slots 98' in a fixed chuck plate 102. The rollers 100 are freely rotatably mounted on a spindle projecting longitudinally from one side of a follower plate 103 which is rotatable in the outer casing 104.

Figure 8:
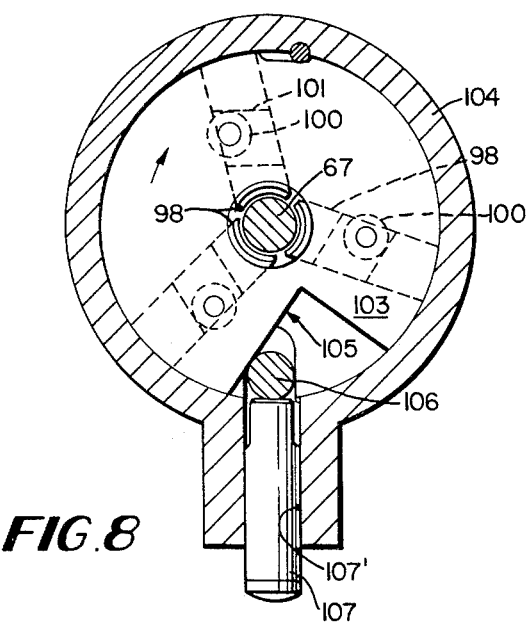
FIGS. 8 and 9 are sectional detals respectively taken substantially on lines 8—8 and 9—9 in FIG. 7 showing tubing feed mechanism.
Figure 9:
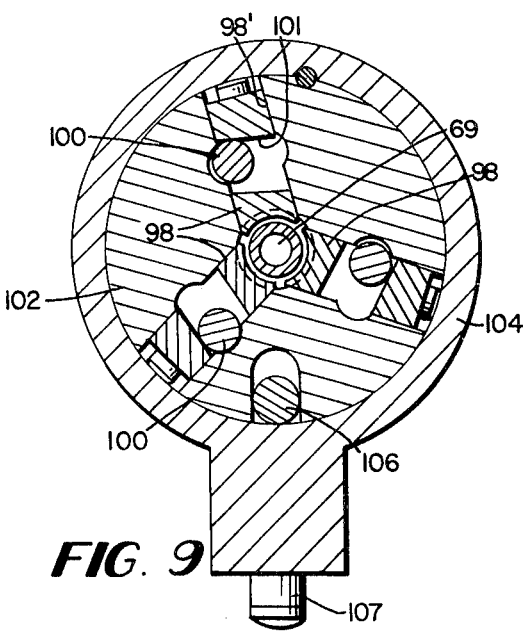
Figure 10:
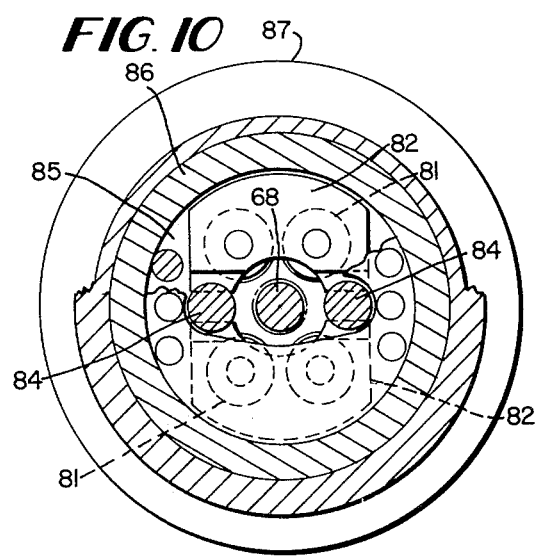
FIGS. 10 and 11 are sectional details taken substantially on lines 10—10 and 11—11 of FIG. 7 showing tubing severing mechanism.
Figure 11:
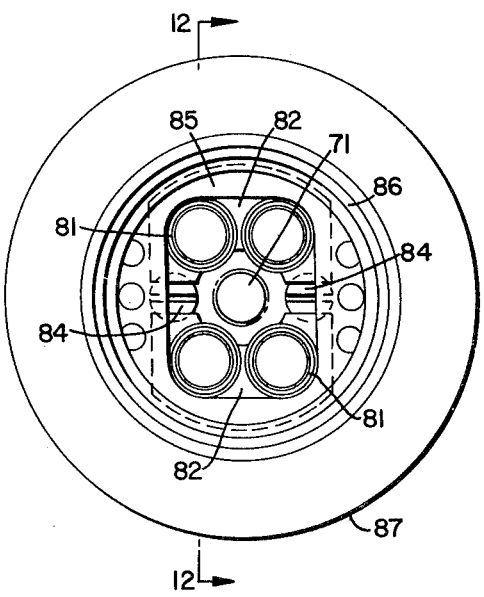
Figure 12:
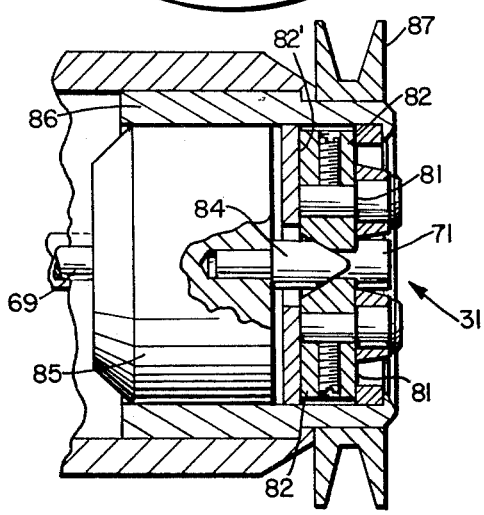
FIG. 12 is a sectional detail taken substantially on line 12—12 in FIG. 11.

Follower plate 103 (FIG. 8) has a camming edge 105 which is engaged by follower roller 106 in turn operable by vertically slidable follower pin 107 bearing on a bridge bar 108' actuated by feeding cam 108 on shaft 56 and operable in the same way as previously described with reference to the severing cam 94. Bar 108' may actuate pins 107 in both stations 31 and 32, similarly to the action of bar 94.

Thus periodically cam 108 will act to displace pin 107 upwardly in its bore 107' to force roller 106 against cam edge 105 and thereby rotate follower plate 103 about its axis. Rollers 100 are thus moved to radially inward parts of their associated slots 101, enabling the springs 99 to displace the clutch jaws radially inwardly to grip the tubing between them and sleeve 96.

Casing 104 is longitudinally slidably mounted on fixed mounting tube 74 and held against rotation about its axis by the slidable key and slot connection at 104'.

Forward feeding movement of the chuck-held tubing is effected by bodily longitudinal movement of the outer casing 104 to the right in FIG. 7 in opposition to the loading effect of a return spring 109 compressed axially between stationary mounting tube 74 and a casing shoulder 110. Spring 109 is compressed when casing 104 is advanced towards the cladding station, and so is energized to act as a return spring when the chuck assembly is to return to non-gripping condition.

The necessary axial movement of casing 104 is effected by a follower pin 111 carried by bearing roller 112 located between a pair of axial-throw face cams 113 mounted on shaft 56 for operation in synchronism with the intermittent drive of carrier drum 34 and the operation of knives 81. Pin 111 extends into a confining bore 111' in casing 104 and under the control of the face cams is shifted back and forth as indicated by the arrows. The cam action is such that pin 111 is shifted to the right in FIG. 7 only during the short period that the tubing is being fed longitudinally, and is shifted to and held to the left in FIG. 7 the balance of the time.

Figure 22:
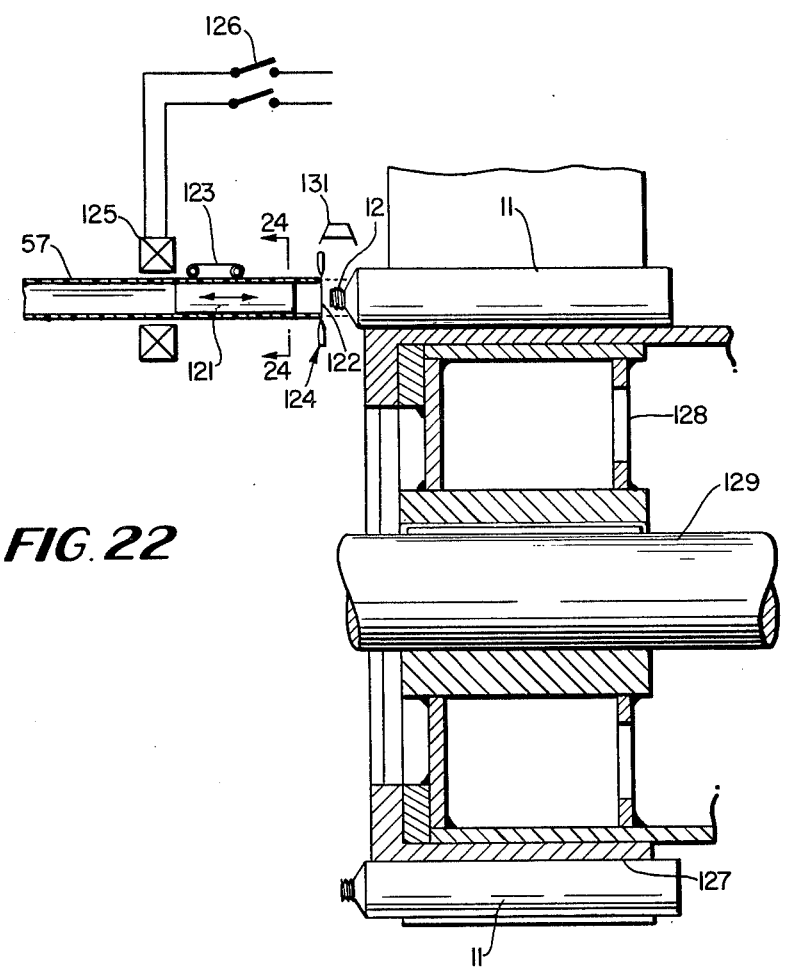
FIG. 22 is a partially diagrammatic and partially sectional view substantially on line 22—22 in FIG. 23 illustrating the invention according to a further embodiment.
Figure 23:
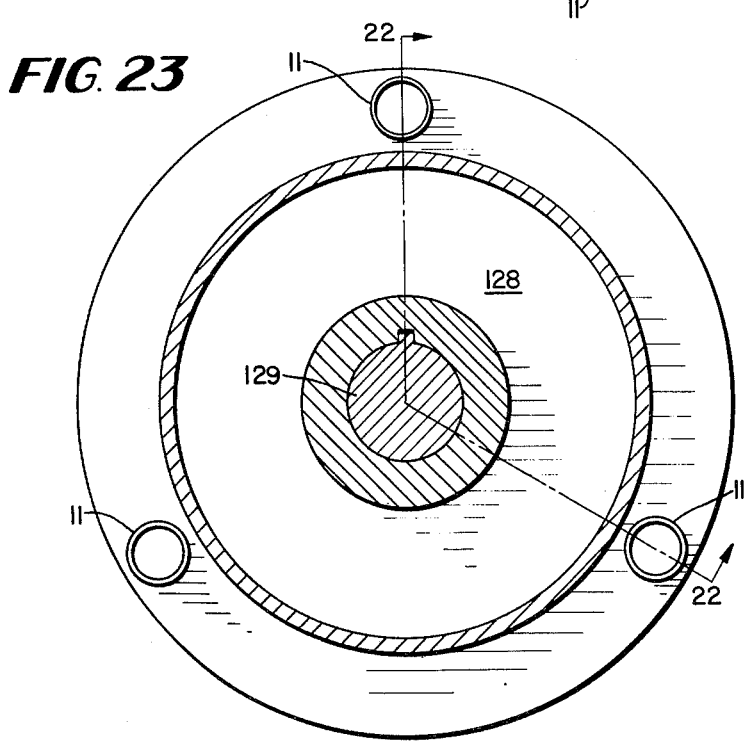
FIG. 23, is an end view in section of the apparatus of FIG. 22 showing the turntable mounting the containers to be modified.
Figure 24:
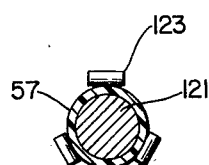
FIG. 24 is a section substantially on line 24—24 in FIG. 1 showing a tubing feed arrangement.

A further embodiment is illustrated in FIGS. 22-24. A feeding and cutting device for the initially continuous flexible tubing 57 comprises a mandrel rod 121 of ferromagnetic material adapted for insertion in a free end 122 of said tubing, a plurality of continuous-belt conveyors 123 adapted to grip the outer surface of said tubing and urge it away from its storage reel towards the neckpiece to be covered, a rotary knife 124 adapted to sever said tubing at a region between the free end of said neckpiece and the adjacent end of said rod, and magnetic means 125 adapted when energized to urge said rod 121 and hence the free end of said tubing, in an axial direction for a pre-set distance away from said protrusion, thereby permitting the latter to be swept clear of the axis of movement of said rod, and means to de-energize said magnetic means thereafter, thus permitting a subsequent engagement of the newly-formed free end of said tubing under the influence of said belt conveyors, with a similar neckpiece brought into alignment with said axis.

Preferably, said conveyors are three in number, the two lowermost of the three being disposed approximately 120° apart at a common level, and the third of them being located in a region above the free end of a length of polyethylene or other plastic tubing. Thus, after inserting the ferromagnetic rod 121 until it occupies a position within the tubing which permits the free end thereof to project beyond said rod to an extent approximately equal to or slightly more than the length of the container neck to be covered as shown in full lines in FIG. 22, the conveyors urge the tubing towards the neckpiece and at the same time convey the rod 121 which is gripped therein, this being shown in dotted lines in FIG. 22. To facilitate the initial insertion of the rod, one of said conveyors, e.g., the upper one, may be capable of withdrawal on hinged or other means so as to provide ready access to the upper surfaces of the lower two conveyors upon which said tubing, with its enclosed rod, may be laid.

The magnet 125 may be an electro-magnet energized via a circuit including switch 126, the operation of which is coordinated with the means which operates the knife or other cutter to sever the plastic tubing. The magnet is preferably of such strength that the rod is displaced relative to the conveyor-engaged tubing so that when the next toothpaste tube is aligned with the tubing the free end of the tubing projects beyond the rod as shown in full lines in FIG. 22. In addition, the switch 126 may be coordinated with the means which swing the treated toothpaste tube or the like out of the region of the axis of the rod, thereby bringing the next said toothpaste tube into its capping position. The toothpaste tubes are mounted in equiangularly spaced apart sockets 127 of a turntable 128 swingable about an arbor 129, and this turntable may be moved to and indexed at the desired dwell positions for the thread covering operation by a suitable drive (not shown).

In modifications of this phase of the invention, the electro-magnet may be replaced by one or more permanent magnets adapted to move into or out of a position wherein they may readily influence the rod. The rod itself may be replaced by a hollow cylindrical or tubular member, depending upon the weight which the two lower conveyors are capable of supporting. The conveyors may be provided with conventional endless belts, or with tubular belts to which compressed air or the like is admitted. Heater unit 131 is adapted to heat shrink the severed length of said plastic tubing upon the neckpiece.

In the foregoing embodiments of the invention the open end of the plastics tubing has a diameter enabling it to slide readily onto the threaded container neck and preferably with a light friction fit upon the threads for assisting retaining the severed element on the threads until heat shrinking takes place.

While in the foregoing specific embodiments the severed cover elements are described as applied to container necks having threads or like fastener projections, the invention in its broadest sense contemplates a continuous method and apparatus for supplying cover elements of suitable size and applying them to a continuously presented succession of other articles such as non-threaded container necks, for example as heat shrink tamper proof covers over the necks of filled wine bottles, and in fact any succession of articles capable of being positioned to receive the elements.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A continuous method for applying covering elements of heat shrinkable plastics material upon articles comprising the steps of positioning articles in succession at an element applying station, periodically longitudinally advancing the open leading end of a length of tubing of said material toward articles positioned at said station, during said advancing moving said tubing over a mandrel to expand the leading end of the tubing to tubular form, periodically severing said tubing near said open end in timed relation with advance of said tubing to provide a succession of tubular elements of desired length each separated from said tubing and positioned in alignment with an article at said station, axially advancing a severed tubular element onto an article at said station during each period of advance of said tubing, and heat shrinking said elements onto said articles at said station.

2. A method for applying a covering element of heat shrinkable plastics material upon the neck of a dispensing container comprising the steps of positioning a container at an element applying station, longitudinally advancing the open leading end of a length of tubing of said material toward the neck of the container positioned at said station, during said advancing moving said tubing over a mandrel to expand the leading end of the tubing to tubular form, severing said tubing near said open end to provide a tubular element of desired length separated from said tubing and positioned in alignment with said neck, axially advancing said severed element into surrounding relation upon said neck at said station during advance of said tubing, and heat shrinking said element onto said neck at said station.

3. The method defined in claim 2 wherein said container has a metal neck and adjacent shoulder portion and wherein the step of positioning said container at said station comprises conveying containers successively from a drying oven, where container bodies are heated to dry a surface coating, and locating said containers at said station while sufficient heat is retained in the metal to at least partly heat shrink said element upon said neck.

4. The method defined in claim 3, wherein an annular undercut region is provided near the juncture of the neck and shoulder of the container and the leading end of the element is initially heat shrunk into said region.

5. A method for covering the externally threaded metal neck of a dispensing container for protecting the threads against abrasion by contents from said container comprising the steps of providing a container having an externally threaded metal neck portion, positioning said container at an element applying station, expanding to tubular condition and periodically longitudinally advancing the leading end of a supply of initially flat tubing of said material toward the neck of the container positioned at said station, during said advancing moving said tubing over a mandrel to expand the leading end of the tubing to the tubular condition, severing said tubing near the end thereof at the end of an advance period to provide a preformed tubular element of desired length separated from said tubing and positioned in alignment with said externally threaded neck, axially advancing said severed element onto said neck in surrounding relation to said threads during the succeeding advance period, heat shrinking said advanced element onto said neck threads and then rotatably applying the closure device for said container onto said covered neck threads.

6. The method defined in claim 5, wherein said element is heat shrunk onto said neck at said station and then the container is moved to a further station where said closure device is applied.

7. The method defined in claim 6, including the step of applying supplemental heat to said covered neck prior to applying said closure device.

8. A method for applying covering elements of heat shrinkable synthetic plastics material upon externally threaded articles, comprising the steps of successively positioning articles at an element applying station, gripping and periodically longitudinally advancing the tubular open leading end of a length of tubing of said material toward an article positioned at said station, severing a length of tubing near said open end at the end of an advance period to provide a tubular element of desired length separate from said tubing and positioned in axial alignment with said article, then during the ensuing advance period of said tubing pushing said severed element by means of said moving tubing directly onto said article in surrounding relation upon the threads thereof for heat shrinking thereon, and shrinking the element about and upon said article threads.

9. A method for applying a covering element of heat shrinkable synthetic plastics material upon the metal neck of a dispensing container, comprising the steps of positioning a container at an element applying station, providing a supply of tubing of said plastics material in flattened tapelike form, periodically longitudinally advancing the leading end of said tubing toward the neck of the container positioned at said station, expanding the leading open end of said tubing into tubular condition by moving said tubing in surrounding relationship over a mandrel as the tubing is advanced toward said container neck, severing a length of expanded tubing near said open end at the end of said advance period to provide a tubular element of desired length separated from said continuous tubing and positioned in alignment with said neck, displacing said severed tubular element axially during an advance period directly onto said neck in surrounding relation for heat shrinking thereupon, and heat shrinking said element onto said neck.

10. A method for applying a covering element of heat shrinkable plastics material upon the neck of a dispensing container comprising the steps of positioning a container at an element applying station, longitudinally advancing the tubular open leading end of a length of tubing of said material toward the neck of the container positioned at said station, severing a length of tubing near said open end to provide a tubular element of desired length separated from said tubing and positioned in alignment with said neck, axially advancing said severed element into surrounding relation upon said neck at said station by pushing said element onto said neck by said tubing during advance of said tubing, and heat shrinking said element onto said neck at said station.

11. A method for covering the externally threaded metal neck of a dispensing container for protecting the threads against abrasion by contents from said container comprising the steps of providing a container having an externally threaded metal neck portion, positioning said container at an element applying station, expanding to tubular condition and periodically longitudinally advancing the leading end of a supply of initially flat tubing of said material toward the neck of the container positioned at said station, during said advancing moving said tubing over a mandrel to expand the leading end of the tubing to the tubular condition, severing said tubing near the end thereof at the end of an advance period to provide a preformed tubular element of desired length separated from said tubing and positioned in alignment with said externally threaded neck, axially advancing said severed element onto said neck in surrounding relation to said threads during the succeeding advance period by pushing the tubular element onto the container neck threads with said leading end of the tubing, heat shrinking said advanced element onto said neck threads and then rotatably applying a closure device for said container onto said covered neck threads.

* * * * *